US012434167B2

(12) United States Patent
Willis

(10) Patent No.: US 12,434,167 B2
(45) Date of Patent: Oct. 7, 2025

(54) MOCKUP GAME CONTROLLER DEVICE

(71) Applicant: Geoffrey Willis, San Juan Capistrano, CA (US)

(72) Inventor: Geoffrey Willis, San Juan Capistrano, CA (US)

( * ) Notice: Subject to any disclaimer, the term of this patent is extended or adjusted under 35 U.S.C. 154(b) by 171 days.

(21) Appl. No.: 18/526,631

(22) Filed: Dec. 1, 2023

(65) Prior Publication Data

US 2025/0177879 A1 Jun. 5, 2025

(51) Int. Cl.

| | |
|---|---|
| ***A63H 33/26*** | (2006.01) |
| ***A63H 33/00*** | (2006.01) |
| ***A63H 33/18*** | (2006.01) |
| ***A63H 33/30*** | (2006.01) |
| *A63F 13/98* | (2014.01) |

(52) U.S. Cl.

CPC ........... *A63H 33/18* (2013.01); *A63H 33/003* (2013.01); *A63H 33/26* (2013.01); *A63H 33/30* (2013.01); *A63F 13/98* (2014.09)

(58) Field of Classification Search

CPC .... A63H 33/00; A63H 33/003; A63H 33/046; A63H 33/26; A63H 33/30

See application file for complete search history.

(56) References Cited

U.S. PATENT DOCUMENTS

| | | | | |
|---|---|---|---|---|
| 7,731,191 | B2 | 6/2010 | Sternberg | |
| 9,021,544 | B1 | 4/2015 | Bourbeaux | |
| 10,137,364 | B2 | 11/2018 | Schmitz | |
| 10,201,747 | B2 | 2/2019 | Mistry | |
| 11,527,344 | B2 * | 12/2022 | Kuo | E04B 1/612 |
| D990,571 | S | 6/2023 | Zhang | |
| 11,766,622 | B1 * | 9/2023 | Chen | A63H 33/046 446/92 |
| 2005/0170739 | A1 * | 8/2005 | Zoellner | A63H 33/046 446/92 |
| 2013/0130800 | A1 | 5/2013 | Sirilux | |
| 2016/0199749 | A1 * | 7/2016 | Whittaker | A63H 33/046 434/278 |
| 2018/0185765 | A1 * | 7/2018 | Zheng | A63H 33/008 |
| 2023/0133332 | A1 | 5/2023 | Samperi | |

FOREIGN PATENT DOCUMENTS

| | | |
|---|---|---|
| WO | WO2016200551 | 12/2016 |

* cited by examiner

*Primary Examiner* — John A Ricci

(57) ABSTRACT

A mockup game controller device for alleviating frustration includes a cushion structured to have a central panel portion and a pair of wings such that the cushion has the ornamental appearance of a gaming system controller. The cushion is comprised of a resiliently compressible material to facilitate a user to throw the cushion against an object in frustration without damaging either of the cushion or the object. A face plate is removably attachable to the cushion and the face plate breaks away from the cushion when the user throws the cushion against the object in frustration. The face plate is structured to have a central panel portion and a pair of wings such that the face plate has the ornamental appearance of a gaming system controller.

11 Claims, 6 Drawing Sheets

MOCKUP GAME CONTROLLER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mockup controller devices and more particularly pertains to a new mockup controller device for alleviating frustration. The device includes a cushion that is structured to have the ornamental appearance of a gaming system controller. The device includes a face plate that releasably engages the cushion and the face plate is structured to have the ornamental appearance of a gaming system controller. The cushion is comprised of resiliently compressible material thereby facilitating the cushion to be thrown in frustration by a user against an object to alleviate the user's frustration. Additionally, the face plate can break away from the cushion when the cushion is thrown against the object to simulate destruction to further alleviate the user's frustration.

(2) Description of Related Art Including Information Disclosed Under 37 CFR 1.97 and 1.98

The prior art relates to mockup controller devices including a variety of wireless gaming system controllers and a plurality of modular gaming system controllers. In no instance does the prior art disclose a mockup gaming system controller that is comprised of a cushion and a face plate that is removably retained on the cushion to facilitate the cushion to be thrown against an object in frustration.

BRIEF SUMMARY OF THE INVENTION

An embodiment of the disclosure meets the needs presented above by generally comprising a cushion structured to have a central panel portion and a pair of wings such that the cushion has the ornamental appearance of a gaming system controller. The cushion is comprised of a resiliently compressible material to facilitate a user to throw the cushion against an object in frustration without damaging either of the cushion or the object. A face plate is removably attachable to the cushion and the face plate breaks away from the cushion when the user throws the cushion against the object in frustration. The face plate is structured to have a central panel portion and a pair of wings such that the face plate has the ornamental appearance of a gaming system controller.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
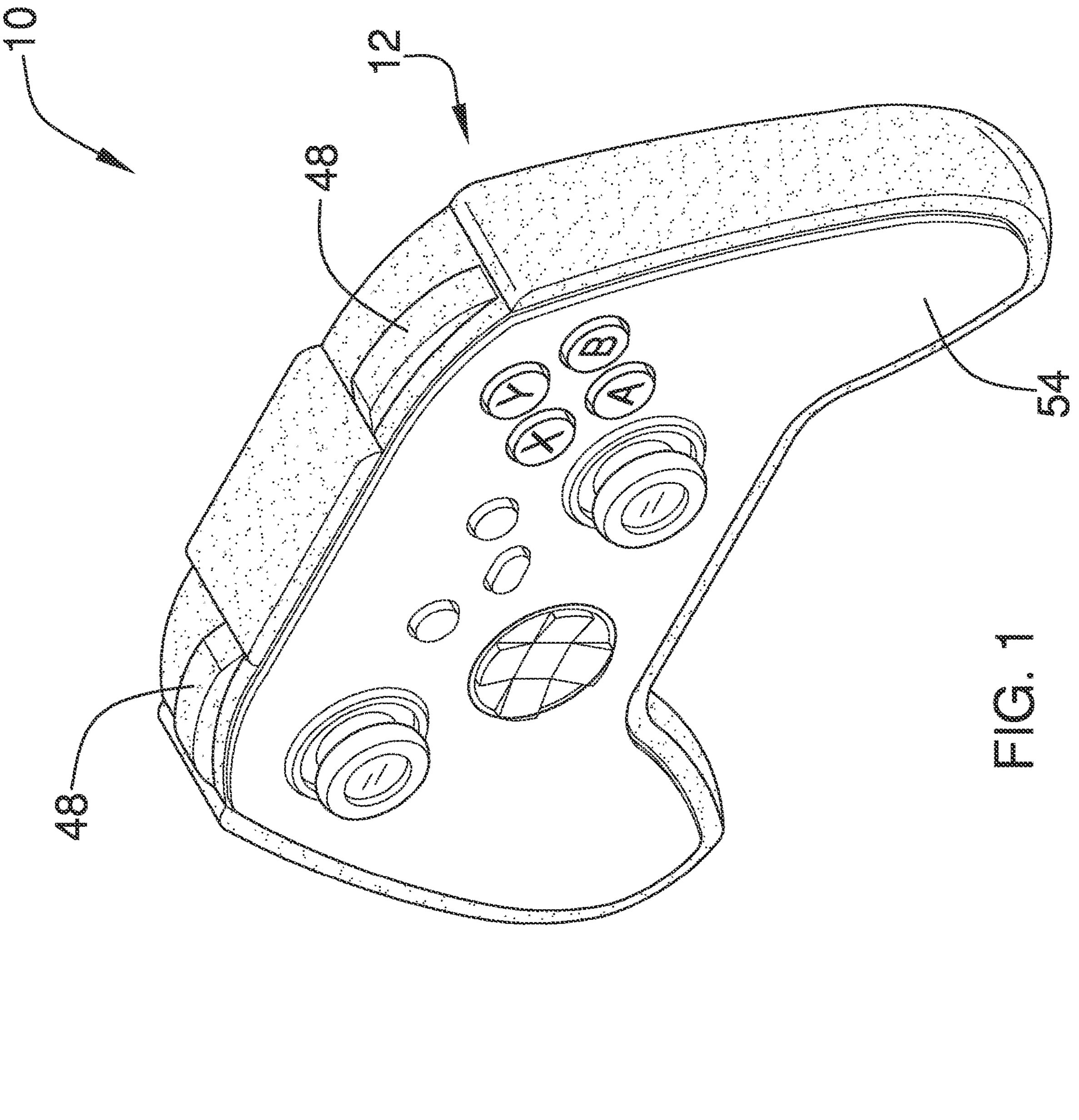
FIG. 1 is a top perspective view of a mockup game controller device according to an embodiment of the disclosure.
Figure 2:
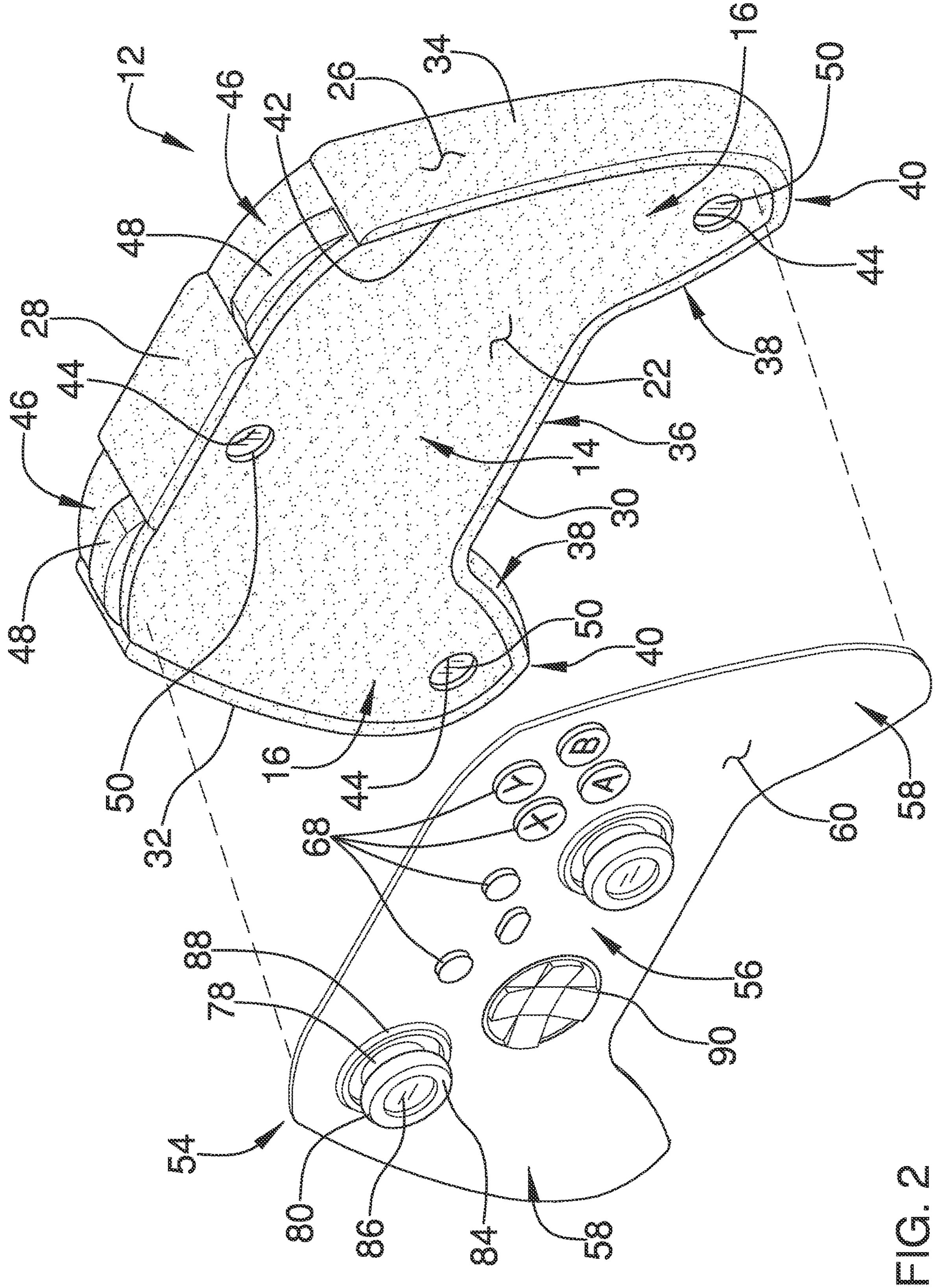
FIG. 2 is an exploded top perspective view of an embodiment of the disclosure.
Figure 3:
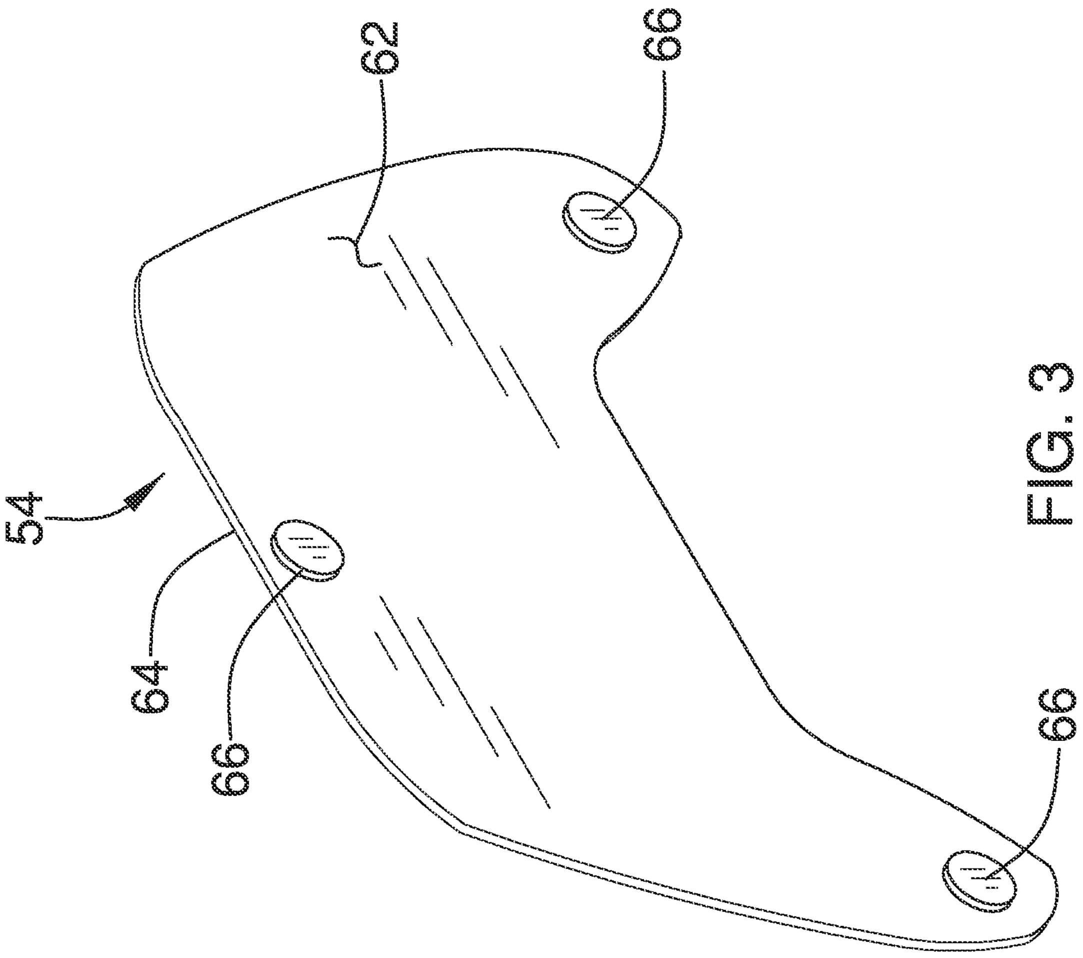
FIG. 3 is a back perspective view of a face plate of an embodiment of the disclosure.
Figure 4:
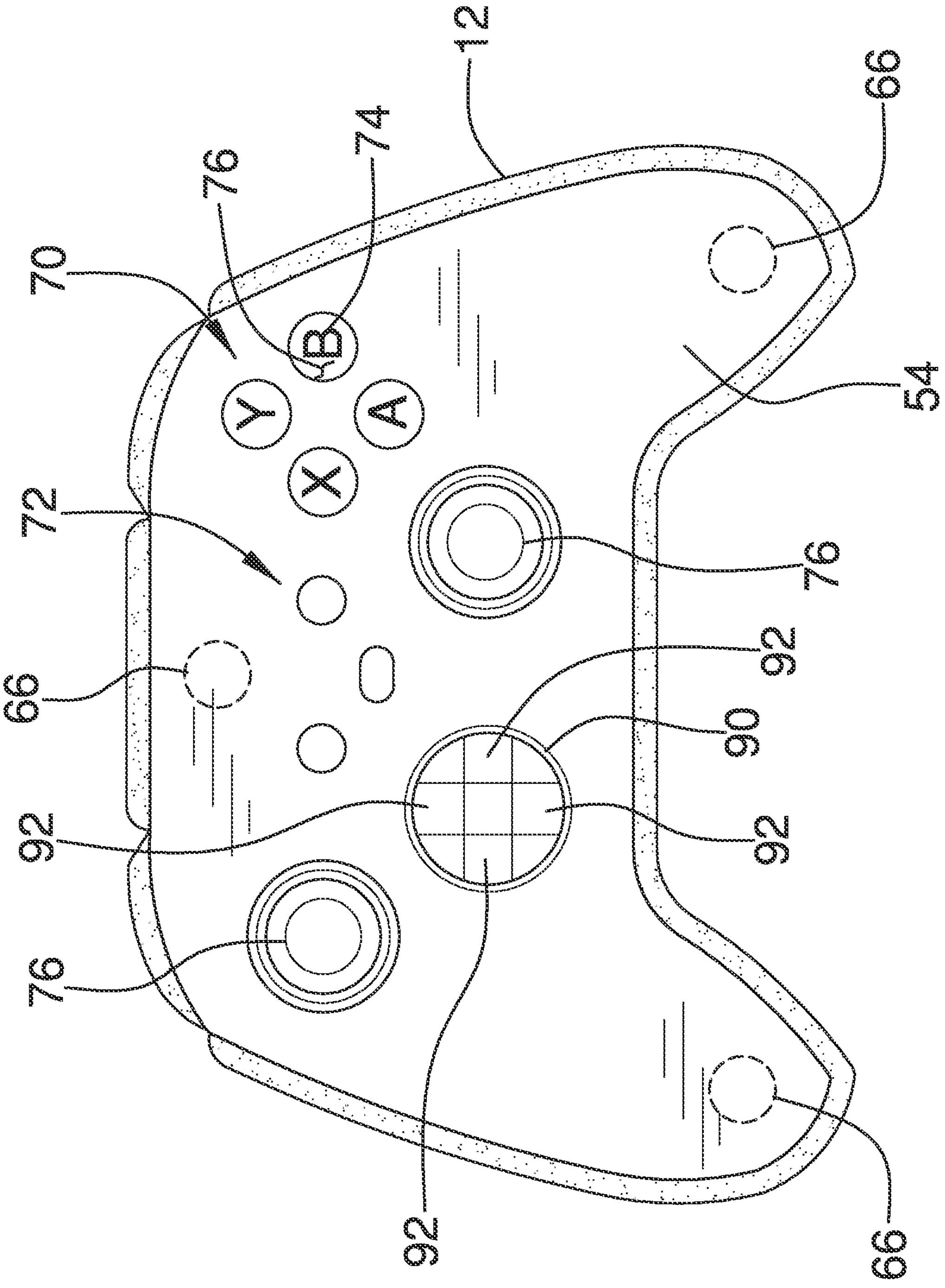
FIG. 4 is a top view of an embodiment of the disclosure.
Figure 6:
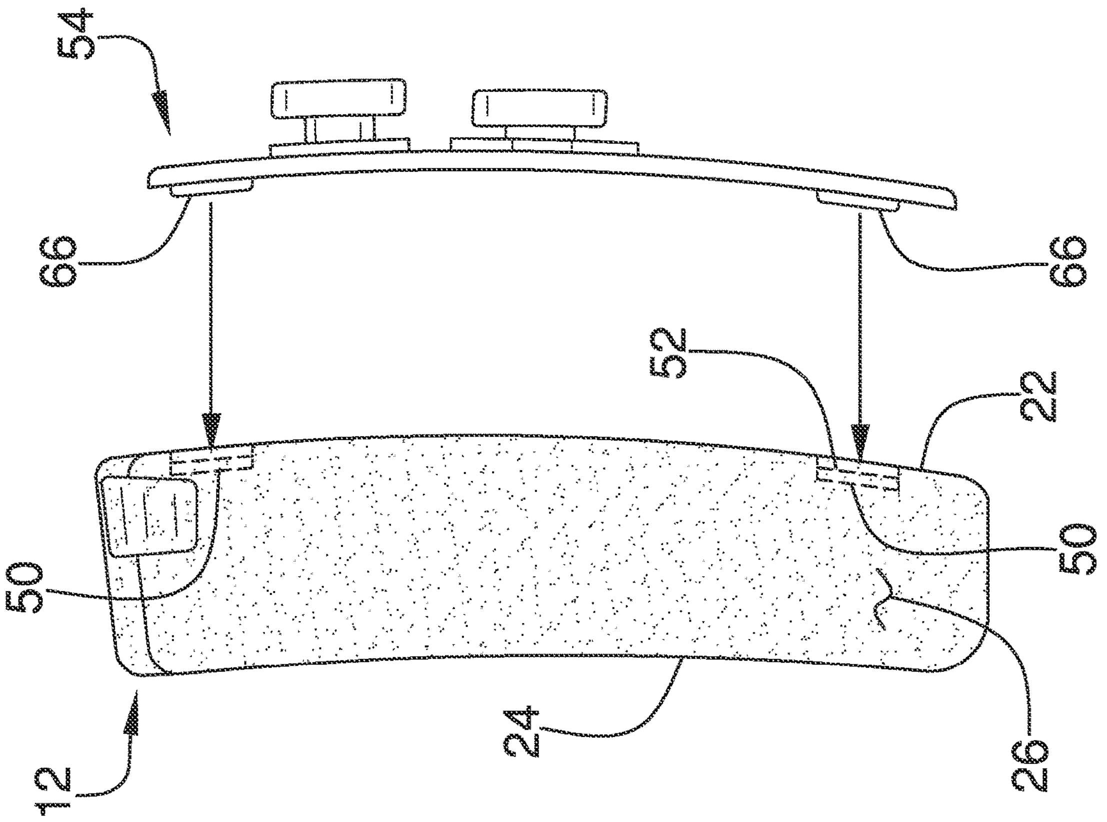
FIG. 6 is an exploded left side view of an embodiment of the disclosure.
Figure 5:
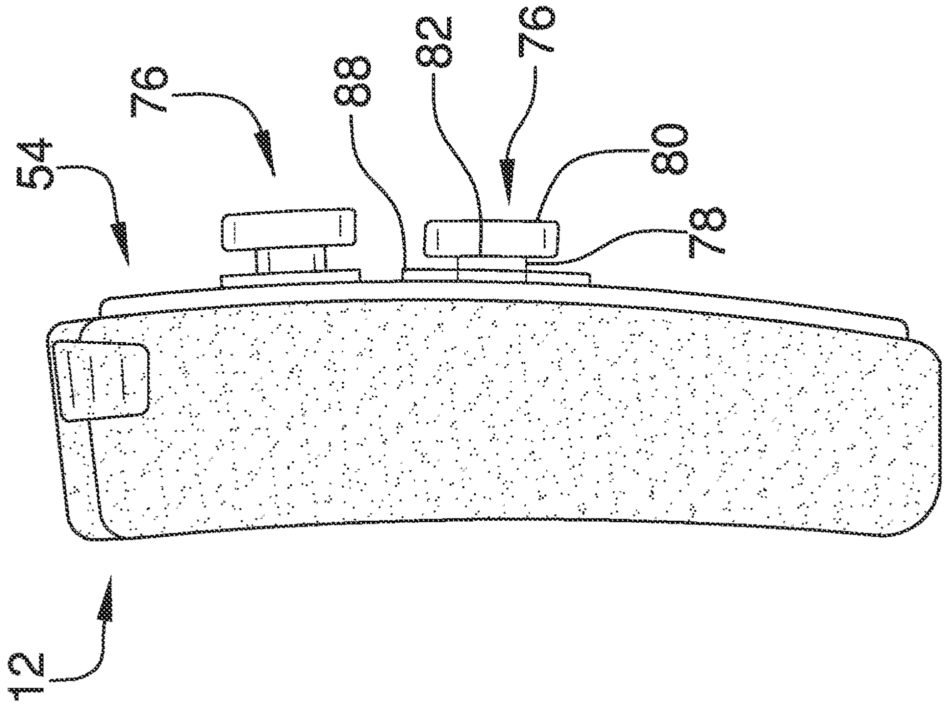
FIG. 5 is a left side view of an embodiment of the disclosure.
Figure 7:
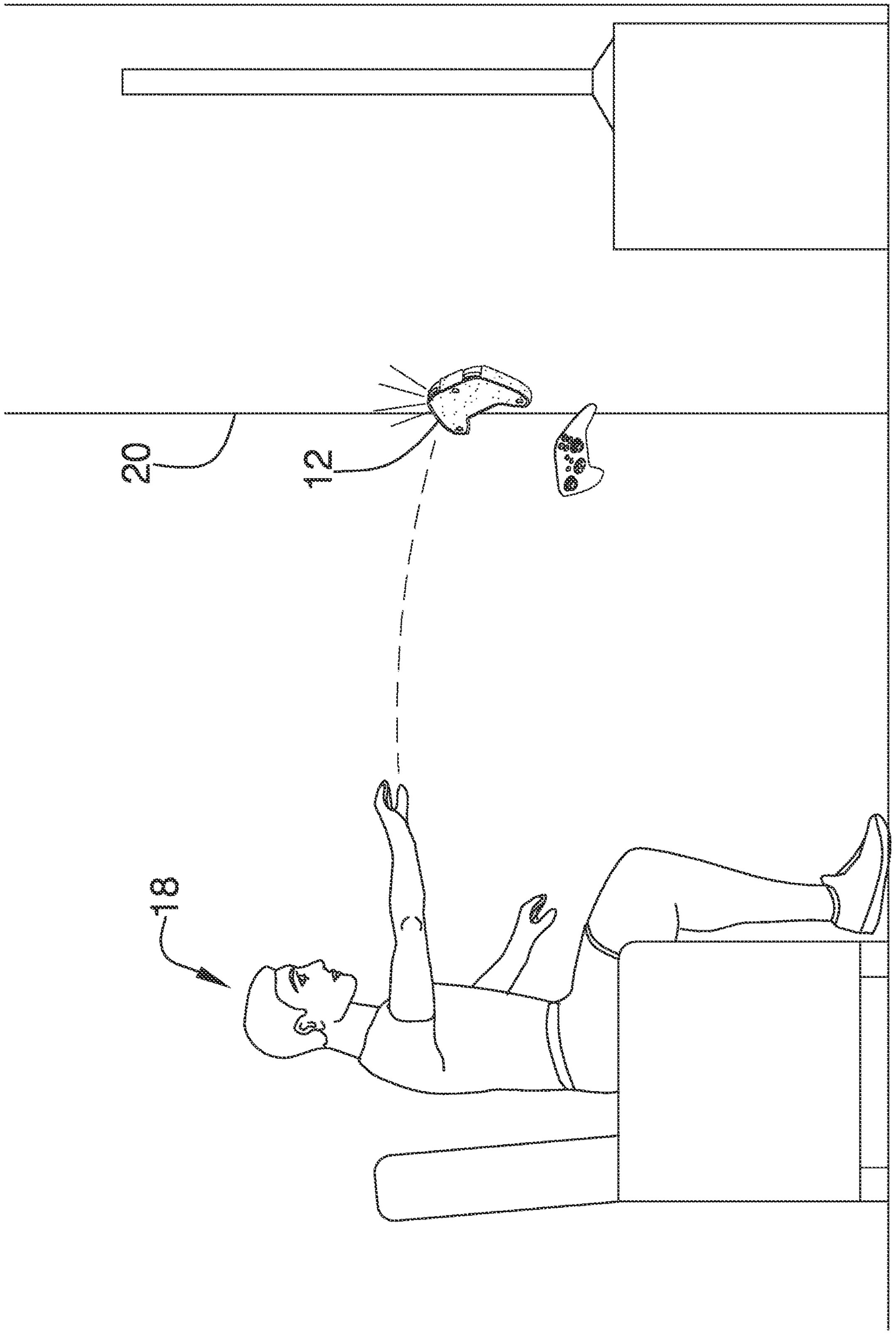
FIG. 7 is a perspective in-use view of an embodiment of the disclosure.

With reference now to the drawings, and in particular to FIGS. 1 through 7 thereof, a new mockup controller device embodying the principles and concepts of an embodiment of the disclosure and generally designated by the reference numeral 10 will be described.

As best illustrated in FIGS. 1 through 7, the mockup game controller device 10 generally comprises a cushion 12 is structured to have a central panel portion 14 and a pair of wings 16 each extending away from the central panel portion 14. In this way the cushion 12 has the ornamental appearance of a gaming system controller. The cushion 12 is comprised of a resiliently compressible material, including but not being limited to, air filled polyurethane or silicone or neoprene. In this way a user 18 can throw the cushion 12 against an object 20 in frustration without damaging either the cushion 12 or the object 20.

The cushion 12 has a top surface 22, a bottom surface 24 and a perimeter surface 26 extending between the top surface 22 and the bottom surface 24. The perimeter surface

26 has a top side 28, a bottom side 30, a first lateral side 32 and a second lateral side 34. Each of the first lateral side 32 and the second lateral side 34 angles outwardly in opposite directions from each other between the top side 28 and the bottom side 30. Additionally, the bottom side 30 has a central portion 36 that extends between a pair of end portions 38 which each angle outwardly from the central portion 36 in opposite directions from each other. The central portion 36 extends along a line that is oriented parallel to the top side 28 of the perimeter surface 26 and each of the pair of end portions 38 intersects a respective one of the first lateral side 32 and the second lateral side 34.

Each of the first lateral side 32 and the second lateral side 34 curves inwardly adjacent to an intersection 40 between the respective end portion 38 of the bottom side 30. Each of the pair of end portions 38 curves toward the intersection 40 between the respective first lateral side 32 and the second lateral side 34 such that the intersection 40 defines a blunt point. Furthermore, each of the pair of wings 16 of the cushion 12 is defined by each of the pair of end portions 38 and the central panel portion 14 of the cushion 12 is defined between the top side 28 of the perimeter surface 26 and the central portion 36 of the bottom side 30 of the perimeter surface 26. The perimeter surface 26 extends upwardly beyond the top surface 22 to define a lip 42 extending around the top surface 22.

The top surface 22 has a plurality of wells 44 each extending toward the bottom surface 24. A respective one of the plurality of wells 44 is spaced from and is centrally located along the top side 28 of the perimeter surface 26. Additionally, a respective one of the plurality of wells 44 is aligned with and is spaced from the intersection 40 between the first lateral side 32 of the perimeter surface 26 and a respective one of the pair of end portions 38 of the bottom side 30 of the perimeter surface 26. A respective one of the plurality of wells 44 is aligned with and is spaced from the intersection 40 between the second lateral side 34 of the perimeter surface 26 and a respective one of the pair of end portions 38 of the bottom side 30 of the perimeter surface 26.

The perimeter surface 26 has a pair of recessed sections 46 each disposed on the top side 28 of the perimeter surface 26 and the pair of recessed sections 46 is positioned on opposite sides of a middle of the top side 28. The lip 42 defined by the perimeter surface 26 is broken along each of the pair of recessed sections 46. Additionally, the perimeter surface 26 has a pair of ridges 48 each extending outwardly from a respective one of the pair of recessed sections 46. Each of the pair of ridges 48 is oriented to extend laterally along a line that is oriented parallel to the top surface 22 of the cushion 12. Furthermore, each of the pair of ridges 48 is positioned closer to the top surface 22 than the bottom surface 24. A plurality of first magnets 50 is each integrated into the cushion 12. Each of the plurality of first magnets 50 is positioned within a respective one of the plurality of wells 44 having an exposed surface 52 of each of the plurality of first magnets 50 being spaced downwardly from the top surface 22 of the cushion 12.

A face plate 54 is removably attachable to the cushion 12 thereby facilitating the face plate 54 to break away from the cushion 12 when the user 18 throws the cushion 12 against the object 20 in frustration. The face plate 54 is structured to have a central panel portion 56 and a pair of wings 58 each angling away from the central panel portion 56 of the face plate 54. In this way the face plate 54 has the ornamental appearance of a gaming system controller. The face plate 54 has an upper surface 60, a lower surface 62 and a perimeter edge 64 extending between the upper surface 60 and the lower surface 62. The perimeter edge 64 is structured to conform to the shape defined by the lip 42 which is defined by the perimeter surface 26 of the cushion 12 when the face plate 54 is positioned against the cushion 12 having the lower surface 62 of the face plate 54 resting on the top surface 22 of the cushion 12.

A plurality of second magnets 66 is each attached to the face plate 54. Each of the plurality of second magnets 66 is strategically positioned on the face plate 54 to facilitate each of the plurality of second magnets 66 to magnetically engage a respective one of the plurality of first magnets 50 thereby releasably retaining the face plate 54 on the cushion 12. Continuing, each of the second magnets 66 is disposed on the lower surface 62 of the face plate 54. Each of the second magnets 66 is aligned with a respective one of the first magnets 50 when the face plate 54 is aligned with the top surface 22 of the cushion 12 for subsequently positioning the face plate 54 against the top surface 22 of the cushion 12.

A plurality of control buttons 68 is provided and each of the plurality of control buttons 68 is attached to the face plate 54 to enhance the ornamental appearance of the face plate 54 with respect to the gaming system controller. Each of the plurality of control buttons 68 is disposed on the upper surface 60 of the face plate 54. The plurality of control buttons 68 includes a group of first buttons 70 arranged to define a respective corner of a rectangle. The plurality of control buttons 68 includes a group of second buttons 72 arranged to define a respective point of a triangle. The group of first buttons 70 is aligned with a transition between the central panel portion 56 of the face plate 54 and a respective one of the pair of wings 58 of the face plate 54. Additionally, the group of second buttons 72 is centrally located on the central panel portion 56 of the face plate 54. Each of the group of first buttons 70 has indicia 74 printed on a topmost surface 76 of the first buttons 70 and the indicia 74 comprise the letters "A" and "B" and "X" and "Y" thereby facilitating the group of first buttons 70 to have the ornamental appearance of control buttons on gaming system controllers.

A pair of control knobs 76 is each attached to the face plate 54 to enhance the ornamental appearance of the face plate 54 with respect to the gaming system controller. Each of the pair of control knobs 76 includes a stem 78 which extends upwardly from the upper surface 60 of the face plate 54 and a head 80 that is attached to a distal end 82 of the stem 78. Additionally, an uppermost surface 84 of the head 80 has a recess 86 extending into the uppermost surface 84. Each of the pair of control knobs 76 includes an annular ring 88 which is disposed on the upper surface 60 of the face plate 54 and which surrounds the stem 78. A respective one of the pair of control knobs 76 is positioned between the group of first buttons 70 and the group of second buttons 72. Additionally, a respective one of the pair of control knobs 76 is positioned between the group of second buttons 72 and the first lateral side 32 of the perimeter edge 64 of the face plate 54.

A directional pad 90 is attached to the face plate 54 to enhance the ornamental appearance of the face plate 54 with respect to the gaming system controller. The directional pad 90 is disposed on the upper surface 60 of the face plate 54. The directional pad 90 has a plurality of sloped prominences 92 each being arranged to intersect each other thereby defining an X shape. Additionally, the directional pad 90 is positioned between the pair of control knobs 76.

In use, the face plate 54 is placed on the top surface 22 of the cushion 12 such that each of the first magnets 50 magnetically engages the second magnets 66 for retaining the face plate 54 on the cushion 12. The user 18 can throw the cushion 12 against an object 20, such as a wall for example, when the user 18 becomes frustrated. The resiliently compressible material of which the cushion 12 is comprised inhibits the cushion 12 or the object 20 from being damaged. Furthermore, the face plate 54 can break away from the cushion 12 when the cushion 12 is thrown against the object 20 thereby facilitating the appearance of destruction to alleviate the user's 18 frustration. In this way the user 18 can react out of frustration or anger in a manner that does not result in damage to gaming system controllers or to surrounding objects.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mockup game controller device for facilitating a user to throw against an object in frustration, said device comprising:

a cushion being structured to have a central panel portion and a pair of wings each extending away from said central panel portion wherein said cushion is configured to have the ornamental appearance of a gaming system controller, said cushion being comprised of a resiliently compressible material wherein said cushion is configured to facilitate a user to throw said cushion against an object in frustration without damaging either of said cushion or the object;

a plurality of first magnets, each of said plurality of first magnets being integrated into said cushion;

a face plate being removably attachable to said cushion wherein said face plate is configured to break away from said cushion when the user throws said cushion against the object in frustration, said face plate being structured to have a central panel portion and a pair of wings each angling away from said central panel portion of said face plate wherein said face plate is configured to have the ornamental appearance of a gaming system controller; and a plurality of second magnets, each of said plurality of second magnets being attached to said face plate, each of said plurality of second magnets being strategically positioned on said face plate to facilitate each of said plurality of second magnets to magnetically engage a respective one of said plurality of first magnets thereby releasably retaining said face plate on said cushion.

2. The device according to claim 1, wherein:

said cushion has a top surface and a bottom surface and a perimeter surface extending between said top surface and said bottom surface;

said perimeter surface has a top side and a bottom side and a first lateral side and a second lateral side;

each of said first lateral side and said second lateral side angles outwardly in opposite directions from each other between said top side and said bottom side;

said bottom side has a central portion extending between a pair of end portions which each angle outwardly from said central portion in opposite directions from each other;

said central portion extends along a line being oriented parallel to said top side of said perimeter surface;

each of said pair of end portions intersects a respective one of said first lateral side and said second lateral side;

each of said first lateral side and said second lateral side curves inwardly adjacent to said intersection between said respective end portion of said bottom side and each of said pair of end portions curves toward said intersection between said respective first lateral side and said second lateral side such that said intersection defines a blunt point;

each of said pair of wings of said cushion is defined by each of said pair of end portions; and said central panel portion of said cushion is defined between said top side of said perimeter surface and said central portion of said bottom side of said perimeter surface.

3. The device according to claim 2, wherein:

said perimeter surface extends upwardly beyond said top surface to define a lip extending around said top surface;

said top surface has a plurality of wells each extending toward said bottom surface;

a respective one of said plurality of wells is spaced from and is centrally located along said top side of said perimeter surface;

a respective one of said plurality of wells is aligned with and is spaced from said intersection between said first lateral side of said perimeter surface and a respective one of said pair of end portions of said bottom side of said perimeter surface; and a respective one of said plurality of wells is aligned with and is spaced from said intersection between said second lateral side of said perimeter surface and a respective one of said pair of end portions of said bottom side of said perimeter surface.

4. The device according to claim 3, wherein:

said perimeter surface has a pair of recessed sections each being disposed on said top side of said perimeter surface;

said pair of recessed sections is positioned on opposite sides of a middle of said top side;

said lip defined by said perimeter surface is broken along each of said pair of recessed sections;

said perimeter surface has a pair of ridges each extending outwardly from a respective one of said pair of recessed sections;

each of said pair of ridges is oriented to extend laterally along a line being oriented parallel to said top surface of said cushion; and each of said pair of ridges is positioned closer to said top surface than said bottom surface.

5. The device according to claim 3, wherein each of said plurality of first magnets is positioned within a respective one of said plurality of wells having an exposed surface of each of said plurality of first magnets being spaced downwardly from said top surface of said cushion.

6. The device according to claim 3, wherein:

said face plate has an upper surface and a lower surface and a perimeter edge extending between said upper surface and said lower surface; and said perimeter edge is structured to conform to the shape defined by said lip defined by said perimeter surface of said cushion when said face plate is positioned against said cushion having said lower surface of said face plate resting on said top surface of said cushion.

7. The device according to claim 6, wherein:

each of said second magnets is disposed on said lower surface of said face plate; and each of said second magnets is aligned with a respective one of said first magnets when said face plate is aligned with said top surface of said cushion for subsequently positioning said face plate against said top surface of said cushion.

8. The device according to claim 1, wherein:

said device includes a plurality of control buttons;

each of said plurality of control buttons is attached to said face plate wherein each of said plurality of control buttons is configured to enhance the ornamental appearance of said face plate with respect to the gaming system controller;

each of said plurality of control buttons is disposed on an upper surface of said face plate;

said plurality of control buttons includes a group of first buttons being arranged to define a respective corner of a rectangle;

said plurality of control buttons includes a group of second buttons being arranged to define a respective point of a triangle;

said group of first buttons is aligned with a transition between said central panel portion of said face plate and a respective one of said pair of wings of said face plate; and said group of second buttons is centrally located on said central panel portion of said face plate.

9. The device according to claim 8, wherein:

said device includes a pair of control knobs;

each of said pair of control knobs is attached to said face plate wherein each of said pair of control knobs is configured to enhance the ornamental appearance of said face plate with respect to the gaming system controller;

each of said pair of control knobs includes a stem extending upwardly from said upper surface of said face plate and a head being attached to a distal end of said stem;

an uppermost surface of said head has a recess;

each of said pair of control knobs includes an annular ring being disposed on said upper surface of said face plate which surrounds said stem;

a respective one of said pair of control knobs is positioned between said group of first buttons and said group of second buttons; and a respective one of said pair of control knobs is positioned between said group of second buttons and said first lateral side of said perimeter edge of said face plate.

10. The device according to claim 9, wherein:

said device includes a directional pad being attached to said face plate wherein said directional pad is configured to enhance the ornamental appearance of said face plate with respect to the gaming system controller;

said directional pad is disposed on said upper surface of said face plate;

said directional pad has a plurality of sloped prominences each being arranged to intersect each other thereby defining an X shape; and said directional pad is positioned between said pair of control knobs.

11. A mockup game controller device for facilitating a user to throw against an object in frustration, said device comprising:

a cushion being structured to have a central panel portion and a pair of wings each extending away from said central panel portion wherein said cushion is configured to have the ornamental appearance of a gaming system controller, said cushion being comprised of a resiliently compressible material wherein said cushion is configured to facilitate a user to throw said cushion against an object in frustration without damaging either of said cushion or the object, said cushion having a top surface and a bottom surface and a perimeter surface extending between said top surface and said bottom surface, said perimeter surface having a top side and a bottom side and a first lateral side and a second lateral side, each of said first lateral side and said second lateral side angling outwardly in opposite directions from each other between said top side and said bottom side, said bottom side having a central portion extending between a pair of end portions which each angle outwardly from said central portion in opposite directions from each other, said central portion extending along a line being oriented parallel to said top side of said perimeter surface, each of said pair of end portions intersecting a respective one of said first lateral side and said second lateral side, each of said first lateral side and said second lateral side curving inwardly adjacent to said intersection between said respective end portion of said bottom side and each of said pair of end portions curving toward said intersection between said respective first lateral side and said second lateral side such that said intersection defines a blunt point, each of said pair of wings of said cushion being defined by each of said pair of end portions, said central panel portion of said cushion being defined between said top side of said perimeter surface and said central portion of said bottom side of said perimeter surface, said perimeter surface extending upwardly beyond said top surface to define a lip extending around said top surface, said top surface having a plurality of wells each extending toward said bottom surface, a respective one of said plurality of wells being spaced from and being centrally located along said top side of said perimeter surface, a respective one of said plurality of wells being aligned with and being spaced from said intersection between said first lateral side of said perimeter surface and a respective one of said pair of end portions of said bottom side of said perimeter surface, a respective one of said plurality of wells being aligned with and being spaced from said intersection between said second lateral side of said perimeter surface and a respective one of said pair of end portions of said bottom side of said perimeter surface, said perimeter surface having a pair of recessed sections each being disposed on said top side of said perimeter surface, said pair of recessed sections being positioned on opposite sides of a middle of said top side, said lip defined by said perimeter surface being broken along each of said pair of recessed sections, said perimeter surface having a pair of ridges each extending outwardly from a respective one of said pair of recessed sections, each of said pair of ridges being oriented to extend laterally along a line being oriented parallel to said top surface of said cushion, each of said pair of ridges being positioned closer to said top surface than said bottom surface;

a plurality of first magnets, each of said plurality of first magnets being integrated into said cushion, each of said plurality of first magnets being positioned within a respective one of said plurality of wells having an exposed surface of each of said plurality of first magnets being spaced downwardly from said top surface of said cushion;

a face plate being removably attachable to said cushion wherein said face plate is configured to break away from said cushion when the user throws said cushion against the object in frustration, said face plate being structured to have a central panel portion and a pair of wings each angling away from said central panel portion of said face plate wherein said face plate is configured to have the ornamental appearance of a gaming system controller, said face plate having an upper surface and a lower surface and a perimeter edge extending between said upper surface and said lower surface, said perimeter edge being structured to conform to the shape defined by said lip defined by said perimeter surface of said cushion when said face plate is positioned against said cushion having said lower surface of said face plate resting on said top surface of said cushion;

a plurality of second magnets, each of said plurality of second magnets being attached to said face plate, each of said plurality of second magnets being strategically positioned on said face plate to facilitate each of said plurality of second magnets to magnetically engage a respective one of said plurality of first magnets thereby releasably retaining said face plate on said cushion, each of said second magnets being disposed on said lower surface of said face plate, each of said second magnets being aligned with a respective one of said first magnets when said face plate is aligned with said top surface of said cushion for subsequently positioning said face plate against said top surface of said cushion;

a plurality of control buttons, each of said plurality of control buttons being attached to said face plate wherein each of said plurality of control buttons is configured to enhance the ornamental appearance of said face plate with respect to the gaming system controller, each of said plurality of control buttons being disposed on said upper surface of said face plate, said plurality of control buttons including a group of first buttons being arranged to define a respective corner of a rectangle, said plurality of control buttons including a group of second buttons being arranged to define a respective point of a triangle, said group of first buttons being aligned with a transition between said central panel portion of said face plate and a respective one of said pair of wings of said face plate, said group of second buttons being centrally located on said central panel portion of said face plate;

a pair of control knobs, each of said pair of control knobs being attached to said face plate wherein each of said pair of control knobs is configured to enhance the ornamental appearance of said face plate with respect to the gaming system controller, each of said pair of control knobs including a stem extending upwardly from said upper surface of said face plate and a head being attached to a distal end of said stem, an uppermost surface of said head having a recess, each of said pair of control knobs including an annular ring being disposed on said upper surface of said face plate which surrounds said stem, a respective one of said pair of control knobs being positioned between said group of first buttons and said group of second buttons, a respective one of said pair of control knobs being positioned between said group of second buttons and said first lateral side of said perimeter edge of said face plate; and a directional pad being attached to said face plate wherein said directional pad is configured to enhance the ornamental appearance of said face plate with respect to the gaming system controller, said directional pad being disposed on said upper surface of said face plate, said directional pad having a plurality of sloped prominences each being arranged to intersect each other thereby defining an X shape, said directional pad being positioned between said pair of control knobs.

* * * * *